United States Patent
Onose et al.

(10) Patent No.: US 11,561,524 B2
(45) Date of Patent: Jan. 24, 2023

(54) PROGRAMMABLE CONTROLLER

(71) Applicant: FANUC CORPORATION, Yamanashi (JP)

(72) Inventors: Nao Onose, Yamanashi (JP); Mitsuru Mochizuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/060,080

(22) Filed: Oct. 1, 2020

(65) Prior Publication Data
US 2021/0132566 A1 May 6, 2021

(30) Foreign Application Priority Data
Oct. 30, 2019 (JP) .............................. JP2019-197432

(51) Int. Cl.
*G05B 19/05* (2006.01)
*G06F 9/48* (2006.01)

(52) U.S. Cl.
CPC ......... *G05B 19/056* (2013.01); *G05B 19/054* (2013.01); *G05B 19/058* (2013.01); *G06F 9/4881* (2013.01)

(58) Field of Classification Search
CPC .. G05B 19/056; G05B 19/054; G05B 19/058; G06F 9/4881
See application file for complete search history.

(56) References Cited

U.S. PATENT DOCUMENTS
2019/0095247 A1* 3/2019 Shimamura ........... G06F 9/4881

FOREIGN PATENT DOCUMENTS
JP S63317834 A 12/1988

OTHER PUBLICATIONS

Imai Mitsuhiro, "Controller device and task execution management method of controller device" English translation for TWI646412, Mar. 28, 2016, ip.com (Year: 2016).*
Choi Hyun Hwa, "Resource allocation and apparatus" (KR 20140097815A, translation), Jan. 30, 2013, ip.com machine translation (Year: 2013).*

* cited by examiner

*Primary Examiner* — Rocio Del Mar Perez-Velez
*Assistant Examiner* — Christopher W Carter
(74) *Attorney, Agent, or Firm* — Hauptman Ham, LLP (57) ABSTRACT

A programmable controller allocates times obtained by dividing executable time in one operation cycle to a plurality of paths, executes sequence programs of the paths within the respective allocated times, and measures extra time that is a remainder of each of the allocation times when execution of each of the sequence programs ends. Then, the programmable controller determines whether a predetermined sequence program is to be executed in the measured extra time, and instructs the sequence execution unit to execute the predetermined sequence program in the extra time in accordance with a result of the determination.

9 Claims, 10 Drawing Sheets

| NUMBER OF PATHS | PATH NAME | | | |
|---|---|---|---|---|
| | FIRST PATH | SECOND PATH | THIRD PATH | FOURTH PATH |
| ONE PATH | 100% | | | |
| TWO PATHS | 80% | 20% | | |
| THREE PATHS | 50% | 30% | 20% | |
| FOUR PATHS | 50% | 30% | 20% | *0% |

| NUMBER OF PATHS | PATH NAME | | | |
|---|---|---|---|---|
| | FIRST PATH | SECOND PATH | THIRD PATH | FOURTH PATH |
| ONE PATH | 100% | | | |
| TWO PATHS | 80% | 20% | | |
| THREE PATHS | 50% | 30% | 20% | |
| FOUR PATHS | 50% | 30% | (*1)20% 0.6ms | (*2)0% 0.4ms |

PROGRAMMABLE CONTROLLER

RELATED APPLICATIONS

The present application claims priority to Japanese Patent Application Number 2019-197432 filed Oct. 30, 2019, the disclosure of which is hereby incorporated by reference herein in its entirety.

BACKGROUND OF THE INVENTION

1. Field of the Invention

The present invention relates to a programmable controller.

2. Description of the Related Art

In a programmable controller (or programmable logic controller (PLC)) used in a computer numerical control (CNC) and the like, sequence programs relating to objects to be controlled such as a body portion of a machine that performs machining, a tool management mechanism unit that manages a tool used in the machining, and peripheral equipment units such as a loader are operated.

The programmable controller repeatedly performs sequence control for each operation cycle thereof. The programmable controller scans (executes) the sequence program for a predetermined executable time from a timing at which each operation cycle is started. In some programmable controllers, a plurality of program levels, for example, a first level and a second level are prepared (for example, Japanese Patent Application Laid-open No. S63-317834).

Figure 9:
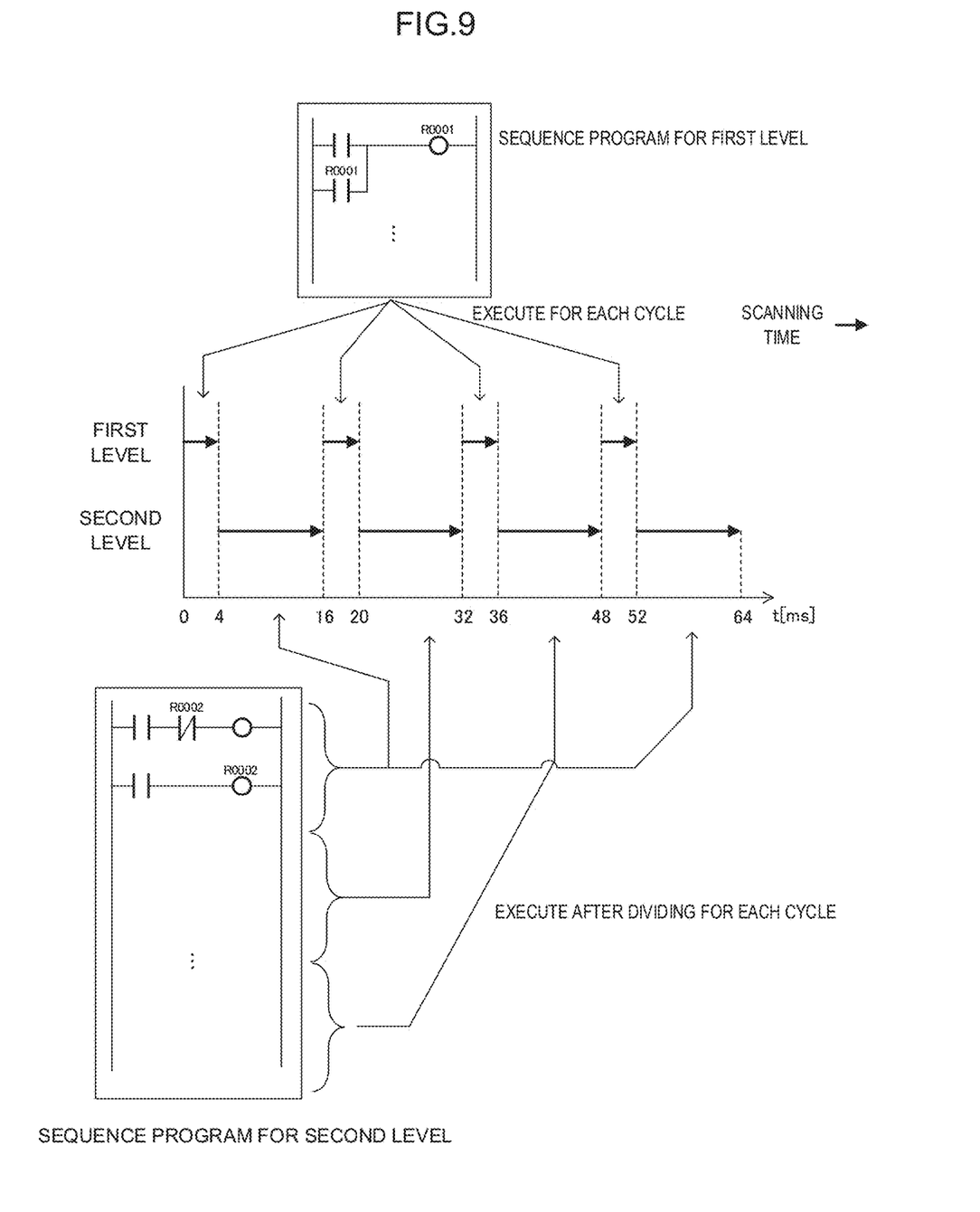
FIG. 9 illustrates the operation of a programmable controller according to a related-art technology.

As illustrated in FIG. 9, a programmable controller that prepares a plurality of program levels always scans (executes) a sequence program prepared for the first level at least once within an executable time. After the scanning (execution) of the sequence program of the first level ends within the executable time, the programmable controller divides a sequence program prepared for the second level by a scannable (executable) amount in the remaining time of the executable time, and scans (executes) the sequence program prepared for the second level in an interrupting manner.

In the example in FIG. 9, the executable time is 16 ms, the scanning in the first level ends at about 4 ms, and the scanning in the second level is performed for about 12 ms that is remaining. When the scanning time of the sequence program is sufficiently small with respect to one executable time, the programmable controller may perform the scanning of the sequence program a plurality of times. For example, when the executable time is 16 ms and the scanning time necessary for the scanning of the sequence program is 8 ms, the scanning of the sequence program is performed twice within the executable time.

Figure 10:
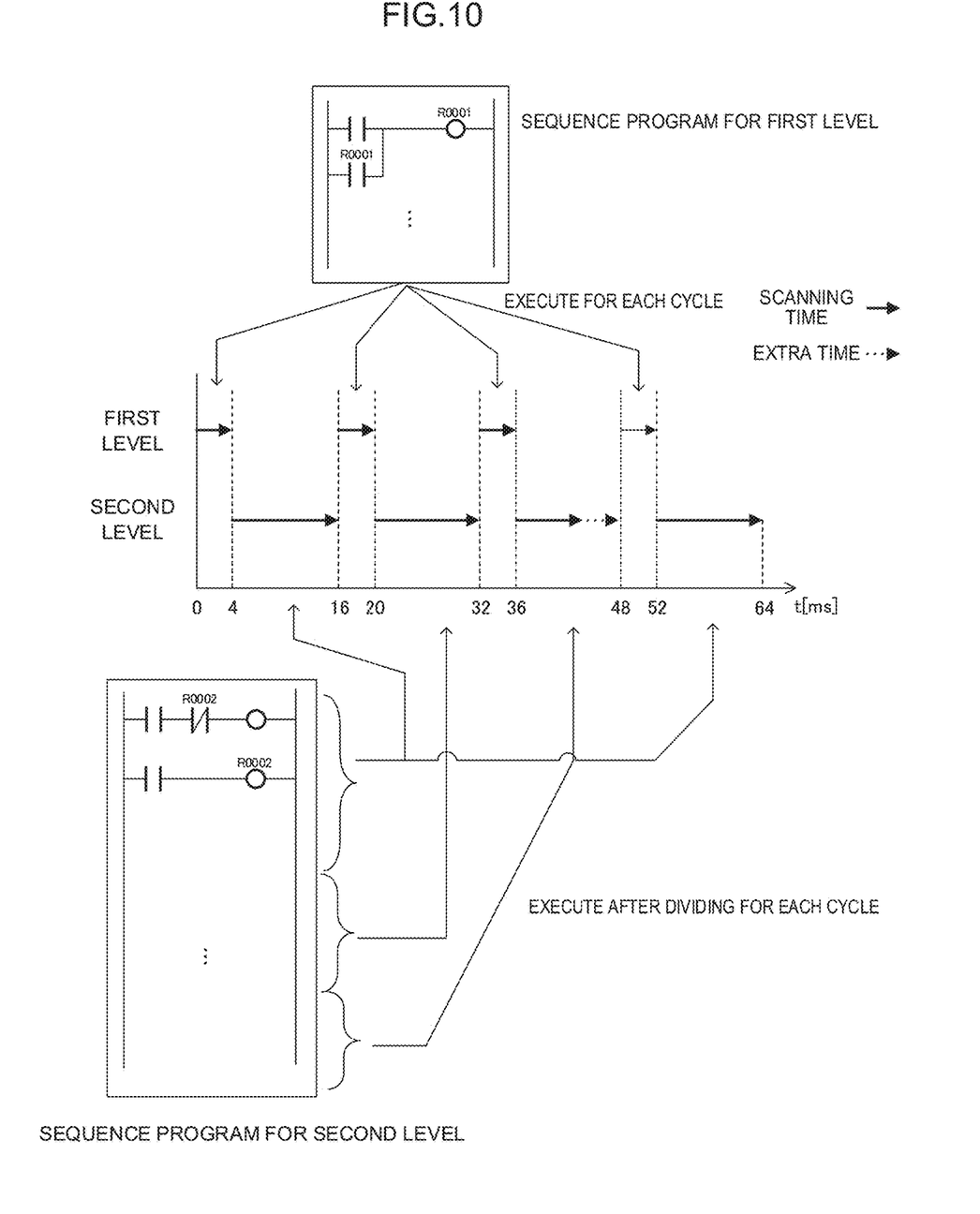
FIG. 10 illustrates a problem of the programmable controller according to the related-art technology.

Incidentally, the time necessary for the scanning of the sequence program changes in accordance with the execution conditions of the function block and the rung to be taken. Therefore, as can be seen in an operation cycle from 32 ms in FIG. 10, when the scanning time of the sequence program to be scanned within the executable time is short in a halfway manner, the scanning of the sequence program cannot be performed for the second time in the remaining time. In this case, the remaining "extra time" in the executable time becomes a waste of time in the operation of the programmable controller.

In the programmable controller, when a plurality of sequence programs of a plurality of units are parallelly executed, the executable time is divided and allocated as the scanning time of the sequence programs of the units. At this time, when the plurality of sequence programs are parallelly scanned by allocating the executable time at a predetermined ratio, extra time is frequently generated when the scanning time of each sequence program fluctuates due to the situation of the peripheral equipment and the processing conditions as described above. As a result, the operation of the programmable controller may be inefficient.

SUMMARY OF THE INVENTION

The problem as described above can be solved by dynamically allocating executable time in consideration of the scanning time of the sequence programs in each operation cycle. However, when the allocation of the executable time of the programmable controller is preset and the starting timing for the scanning of the sequence program of each path in each operation cycle is fixedly determined, there is an advantage in that the operation of the programmable controller can be synchronized with the distribution cycle of the CNC. Therefore, it cannot be stated unconditionally that it is good to change the allocation of the set executable time.

Thus, a method that can efficiently use extra time without changing a processing starting timing while ensuring the allocation of executable time to a plurality of sequence programs is desired.

In the present invention, the abovementioned problem is solved by allocating extra time to the execution of a sequence program of a preset path when the extra time occurs, in a programmable controller that allocates executable time in each operation cycle to a plurality of sequence programs at a preset time ratio and executes the sequence programs in a sequentially repeating manner.

A programmable controller according to the present invention is a programmable controller that allocates, to a plurality of paths, allocation times obtained by dividing executable time in one operation cycle at a predetermined ratio, and executes sequence programs of the paths in the respective allocation times, the programmable controller including: a sequence execution unit that executes the sequence programs within the respective allocation times; an extra time measurement unit that measures extra time that is a remainder of each of the allocation times when execution of each of the sequence programs ends; and an executability determination unit that determines whether or not a predetermined sequence program is to be executed in the extra time measured by the extra time measurement unit and instructs the sequence execution unit to execute the predetermined sequence program in the extra time in accordance with a result of the determination.

The programmable controller can further include an allocation table in which a ratio at which the executable time is allocated to the plurality of paths is defined, and an extra time usage flag that designates a path to be executed in the extra time may be settable in the allocation table. In this case, the executability determination unit may determine, when there is a path on which the extra time usage flag is set, that a sequence program of the path is to be executed in the extra time.

In the programmable controller, an execution condition of the path on which the extra time usage flag is set may be further settable in the allocation table, and the executability determination unit may determine that the sequence program of the path is to be executed in the extra time when the execution condition is satisfied.

In the programmable controller, an order of priority among two or more paths on which the extra time usage flag is set may be further settable in the allocation table, and the executability determination unit may determine a path to be executed in the extra time in consideration of the order of priority.

By including the abovementioned configuration, the present invention can freely allocate the plurality of sequence programs when the control of the abovementioned multipath is performed, and hence a numerical control system can be inexpensively changed and expanded. A more-flexible sequence control is realized by enabling control in which some scanning time is distributed to the sequence control that needs to be reliably performed and control that is less important is executed only when extra time occurs, for example. Economical control becomes possible by efficiently using unused time without changing the timing of starting the sequence.

In the multipath sequence of the related art, one path can only be executed once in one execution cycle. However, according to the present method, the sequence of a predetermined path can be repeatedly executed for a plurality of times when extra time exists. This is effective when updating processing of a signal is faster than the interval of one cycle and in processing such as data collection.

DETAILED DESCRIPTION OF THE PREFERRED EMBODIMENTS

Figure 1:
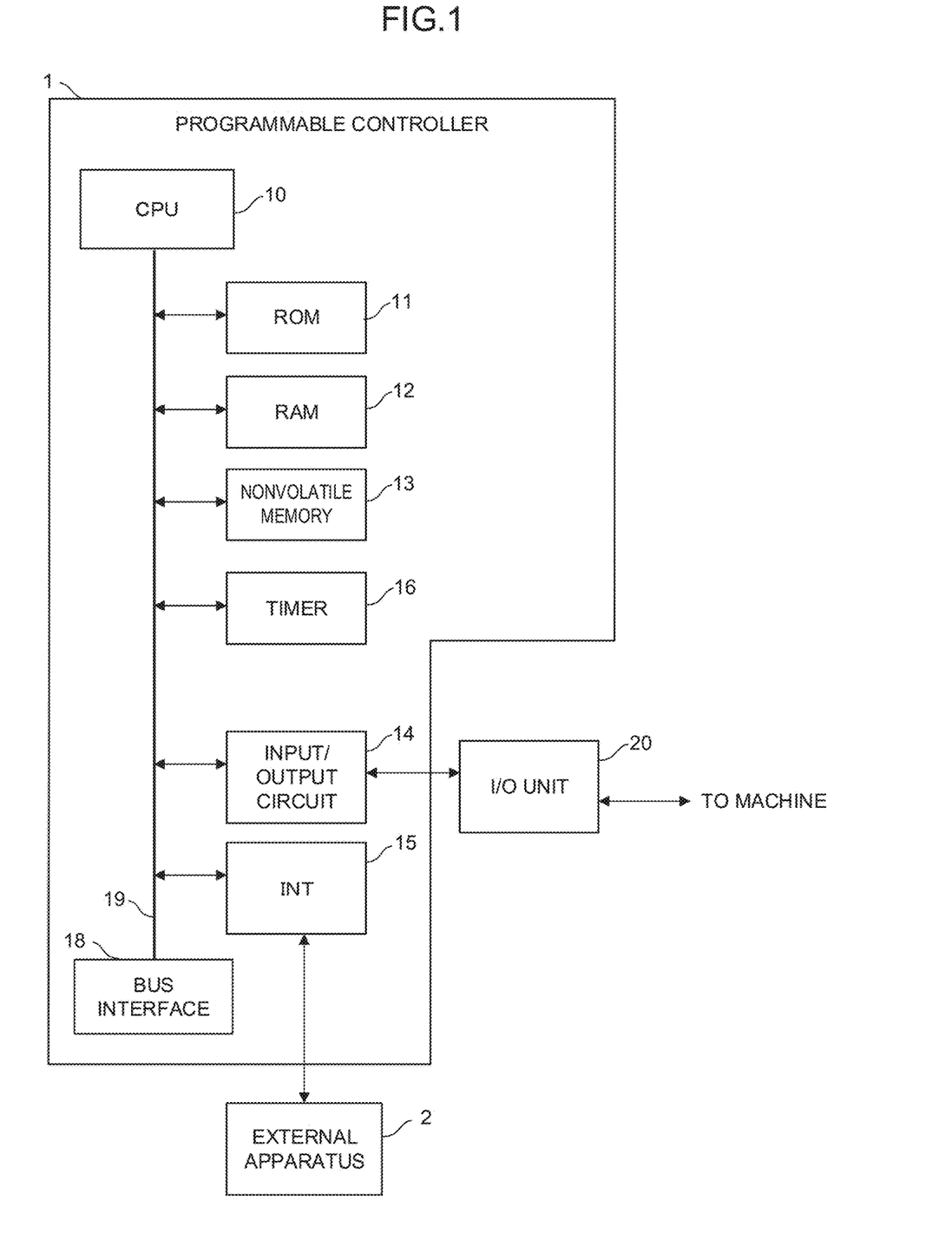
FIG. 1 is a schematic hardware configuration diagram of a programmable controller according to one embodiment.

FIG. 1 is a schematic hardware configuration diagram of a programmable controller according to one embodiment of the present invention.

A programmable controller 1 includes a CPU 10 that executes sequence control. A ROM 11, a RAM 12, a nonvolatile memory 13, an input/output circuit 14, and an interface 15 are connected to the CPU 10 via a bus 19. An external apparatus 2 for performing reading and writing of a CompactFlash memory (CF memory) is connected to the interface 15. The CPU 10 can acquire a sequence program of an execution format object from the external apparatus 2 to which the CF memory and the like are attached via the interface 15 and can record the sequence program in the nonvolatile memory 13. The bus 19 is connectable to a control apparatus such as a computer numerical control via a bus interface 18. Various actuators, sensors, and the like of machines to be controlled such as peripheral apparatuses and machining tools are connected to the input/output circuit 14 via an I/O unit 20.

A system program to be executed by the CPU 10 of the programmable controller 1 is stored in the ROM 11. The CPU 10 controls the operation of each unit of the programmable controller 1 by executing the system program. In the nonvolatile memory 13, sequence programs to be executed by the programmable controller 1 are stored. At the time of the execution of the sequence programs, the CPU 10 reads out the sequence programs from the nonvolatile memory 13, stores the readout sequence programs in a storage region for the sequence programs for execution of the RAM 12, and sequentially executes the sequence programs for execution stored in the RAM 12.

In the RAM 12, a memory region for signals for execution that stores various signals therein when the programmable controller 1 executes the sequence programs is provided, and a region that stores therein the state of an internal relay in the sequence programs, output signals, input signals, and the like that are necessary when the sequence programs are executed is provided in the memory region for signals for execution.

A timer 16 is formed by a real time clock (RTC), for example, and is used for counting the processing time and the like.

Figure 2:
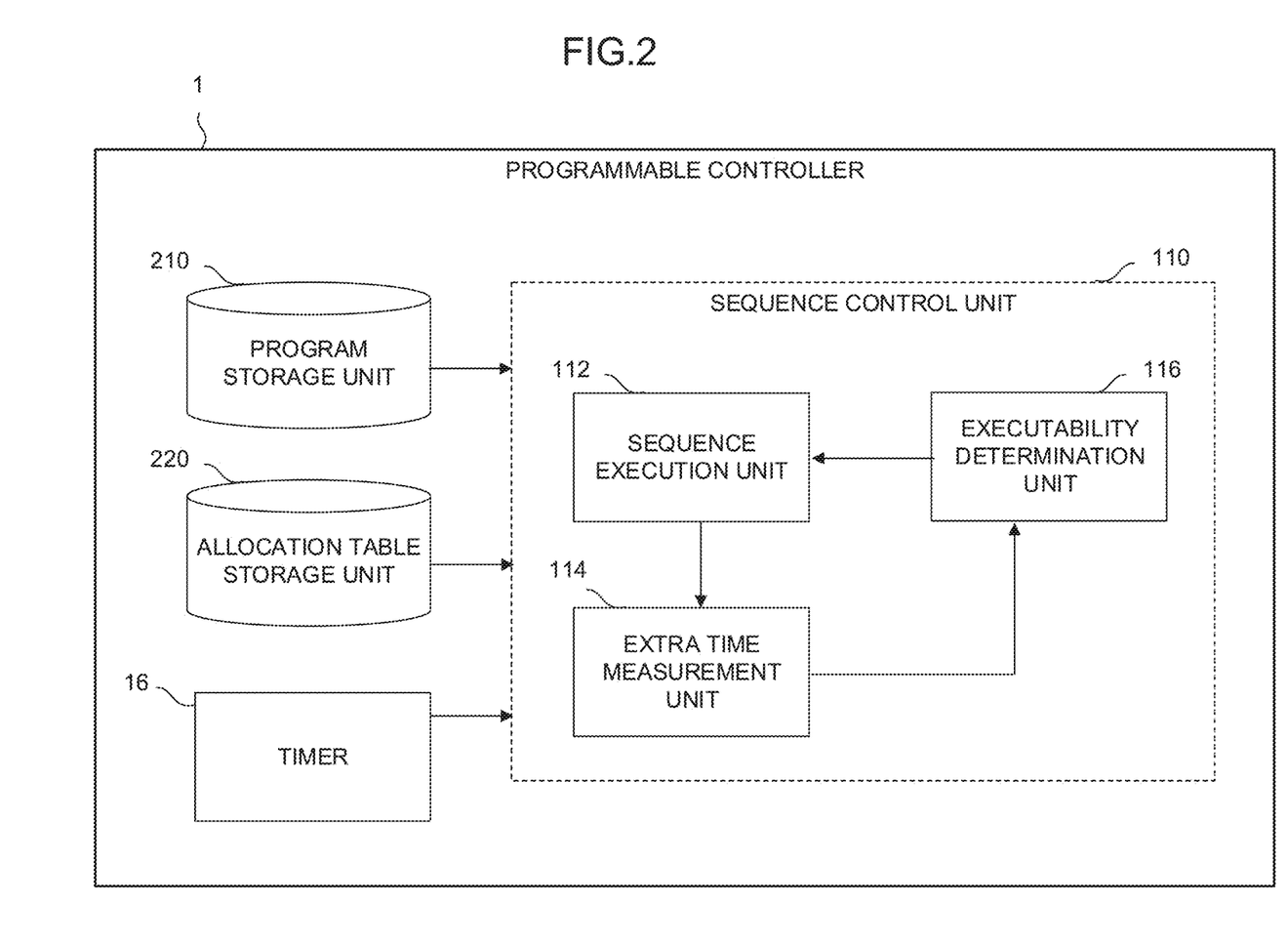
FIG. 2 is a block diagram illustrating schematic functions of the programmable controller according to one embodiment.

FIG. 2 illustrates the functions included in the programmable controller 1 according to one embodiment of the present invention as a schematic block diagram.

The functions included in the programmable controller 1 according to this embodiment are implemented by controlling the operation of the respective units of the programmable controller 1 by executing the system program by the CPU 10 included in the programmable controller 1 illustrated in FIG. 1.

The programmable controller 1 of this embodiment includes a sequence control unit 110. In the RAM 12 or the nonvolatile memory 13 of the programmable controller 1, a program storage unit 210 that is a region that stores therein the sequence programs executed by the programmable controller 1 and an allocation table storage unit 220 that stores therein an allocation table in which information on the allocation of the executable time with respect to the sequence programs is set are provided.

The functions of the sequence control unit 110 are implemented by mainly performing arithmetic processing using the RAM 12 and the nonvolatile memory 13 by the CPU 10 included in the programmable controller 1 illustrated in FIG. 1, counting processing by the timer 16, and input/output processing via the input/output circuit 14 and the bus interface 18 by executing the system program read out from the ROM 11 by the CPU 10. The sequence control unit 110 allocates the executable time of operation cycles to the sequence programs stored in the program storage unit 210 and executes the sequence programs in accordance with the allocated executable time. The sequence control unit 110 includes a sequence execution unit 112, a surplus time determination unit 114, and a divided sequence determination unit 116.

In the allocation table storage unit 220 referred to by the sequence control unit 110, an allocation table in which the information on the allocation of the executable time with respect to the sequence programs is set is stored. The sequence control unit 110 divides the executable time in accordance with the information on the allocation of the executable time set in the allocation table stored in the allocation table storage unit 220 and allocates the divided executable time as the allocation time necessary for the execution of the sequence programs read out from the program storage unit 210.

The sequence execution unit 112 executes at least one sequence program prestored in the program storage unit 210 within each allocation time allocated by the sequence control unit 110. When the entire execution of the sequence program does not end within the allocation time, the sequence execution unit 112 divides the sequence program within a range in which the execution is possible within the allocation time and executes the divided sequence program.

Figure 3:
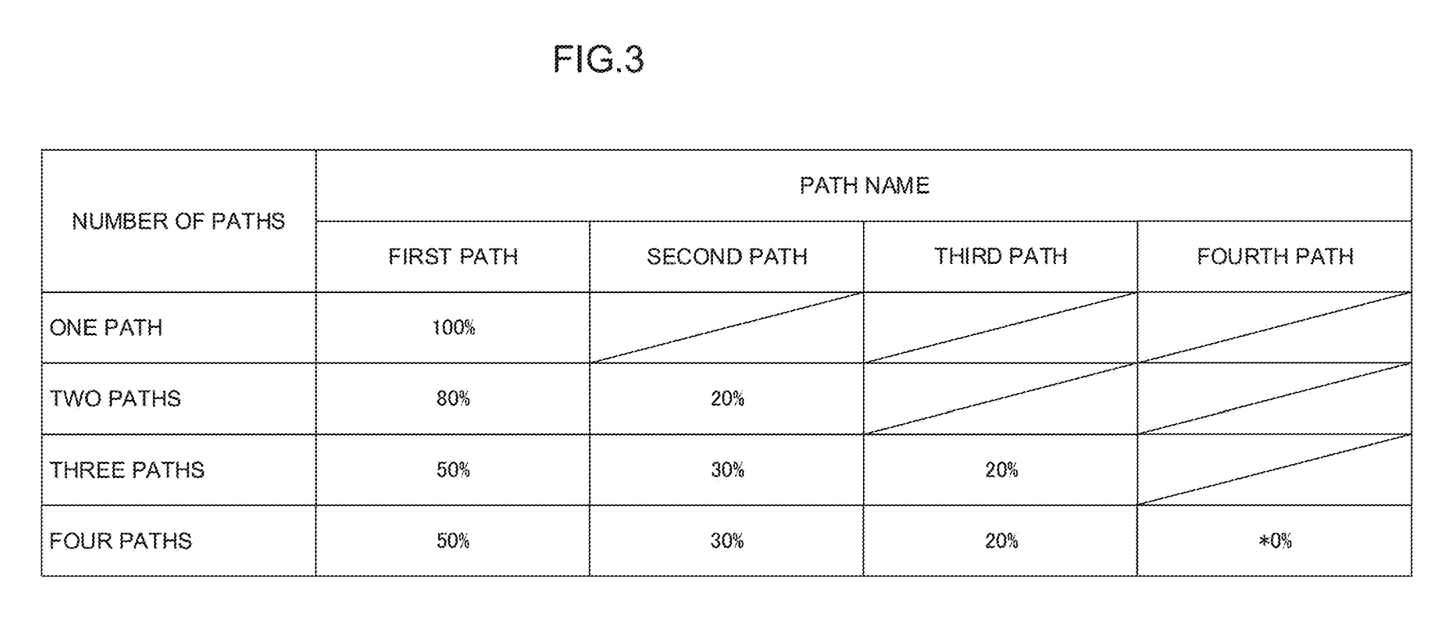
FIG. 3 shows an example of an allocation table.

FIG. 3 shows an example of the allocation table.

The allocation table can be defined as a table in which the ratio at which the executable time is allocated to the execution of the sequence program is set for each path, for example. In the allocation table shown in FIG. 3, for example, when sequence control of a machine including three paths, that is, a first path, a second path, and a third path is performed, the table is defined such that 50% of the executable time is allocated to the execution of the sequence program of the first path, 30% of the executable time is allocated to the execution of the sequence program of the second path, and 20% of the executable time is allocated to the execution of the sequence program of the third path as the allocation time. Further, for example, when the sequence control of a machine including four paths, that is, a first path, a second path, a third path, and a fourth path is performed, the table is defined such that 50% of the executable time is allocated to the execution of the sequence program of the first path, 30% of the executable time is allocated to the execution of the sequence program of the second path, and 20% of the executable time is allocated to the execution of the sequence program of the third path as the allocation time and the allocation time is not allocated to the fourth path. An extra time usage flag (the asterisk in the drawing) is set for the fourth path. The extra time usage flag is given to a path executed in extra time by the operator in advance when the extra time occurs.

Figure 4:
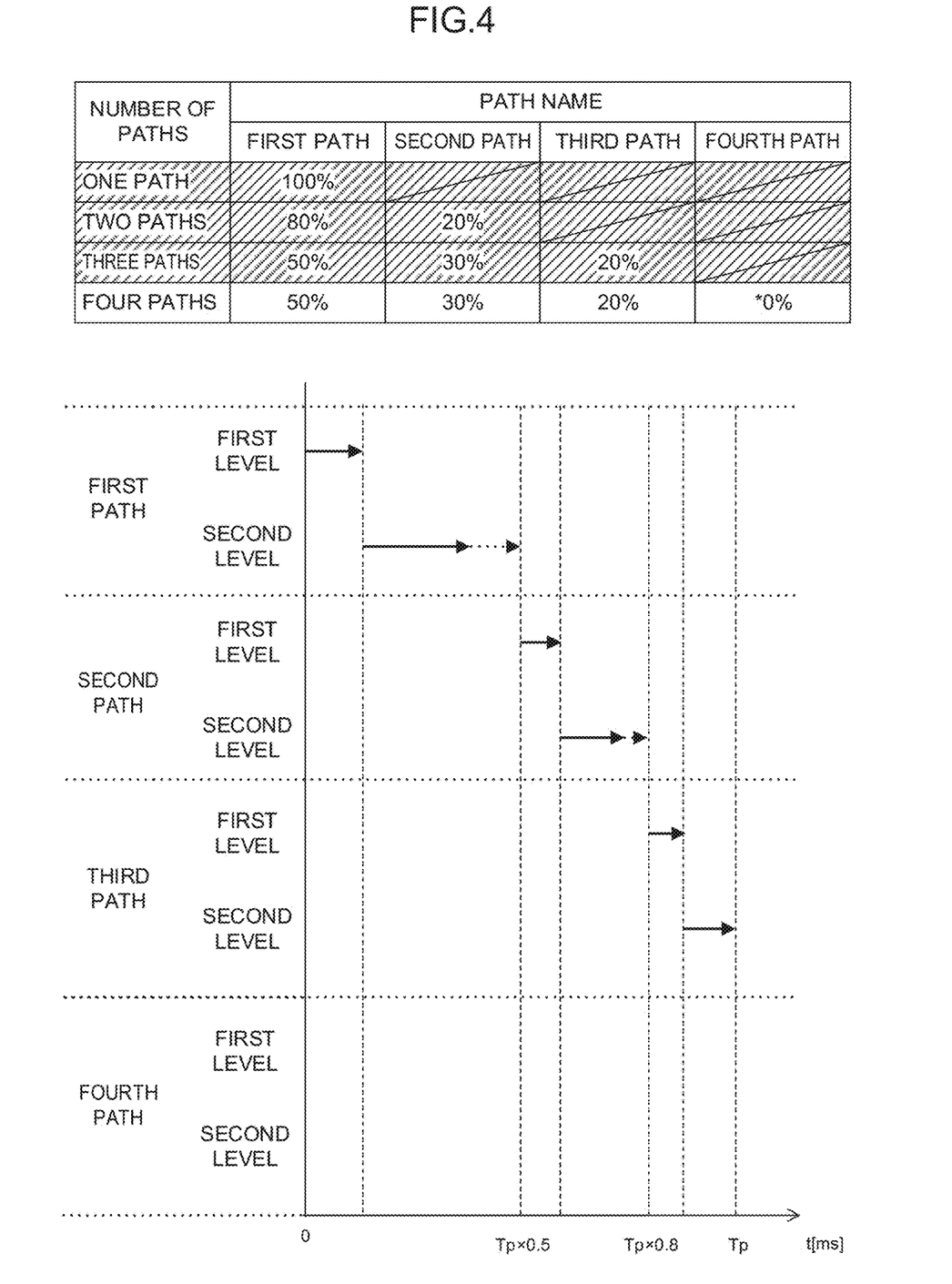
FIG. 4 shows an example in which sequence programs of a plurality of paths are operated in accordance with the allocation table.

FIG. 4 shows an example in which the execution of the sequence programs are performed in order to perform the sequence control of the machine including four paths, that is, the first path, the second path, the third path, and the fourth path by the sequence execution unit 112 in accordance with the allocation table exemplified in FIG. 3.

In the program storage unit 210, a sequence program for a first level and a sequence program for a second level of the first path, a sequence program for a first level and a sequence program for a second level of the second path, a sequence program for a first level and a sequence program for a second level of the third path, and a sequence program for a second level of the fourth path are stored. At this time, the sequence control unit 110:

(i) allocates $T_p \times 0.5$ that is 50% of an executable time $T_p$ to the execution of the sequence program for the first level and the sequence program for the second level of the first path as the allocation time;

(ii) allocates $T_p \times 0.3$ that is 30% of the executable time $T_p$ to the execution of the sequence program for the first level and the sequence program for the second level of the second path; and (iii) allocates $T_p \times 0.2$ that is the remaining 20% of the executable time $T_p$ to the execution of the sequence program for the first level and the sequence program for the second level of the third path as the allocation time.

The sequence control unit 110 does not allocate the allocation time to the fourth path. The sequence execution unit 112 executes the sequence programs of the paths in accordance with the allocated allocation time.

The extra time measurement unit 114 checks whether extra time exists when the sequence execution unit 112 ends the execution of the sequence programs in predetermined allocation time. When the extra time measurement unit 114 confirms that the extra time exists, the extra time measurement unit 114 measures the remaining time of the allocation time as the extra time and outputs the result of the measurement to the executability determination unit 116. For example, in FIG. 4, extra time (dotted arrow) is generated after the execution of the sequence programs of the first path ends and after the execution of the sequence programs of the second path ends.

The executability determination unit 116 determines whether there is a sequence program that is executable in the extra time measured by the extra time measurement unit 114. When the executability determination unit 116 determines that there is a sequence program executable in the extra time, the executability determination unit 116 instructs the sequence execution unit 112 to execute the sequence program in the extra time. The executability determination unit 116 according to this embodiment determines the existence of a sequence program that is executable in the extra time in accordance with whether there is an extra time usage flag.

Figure 5:
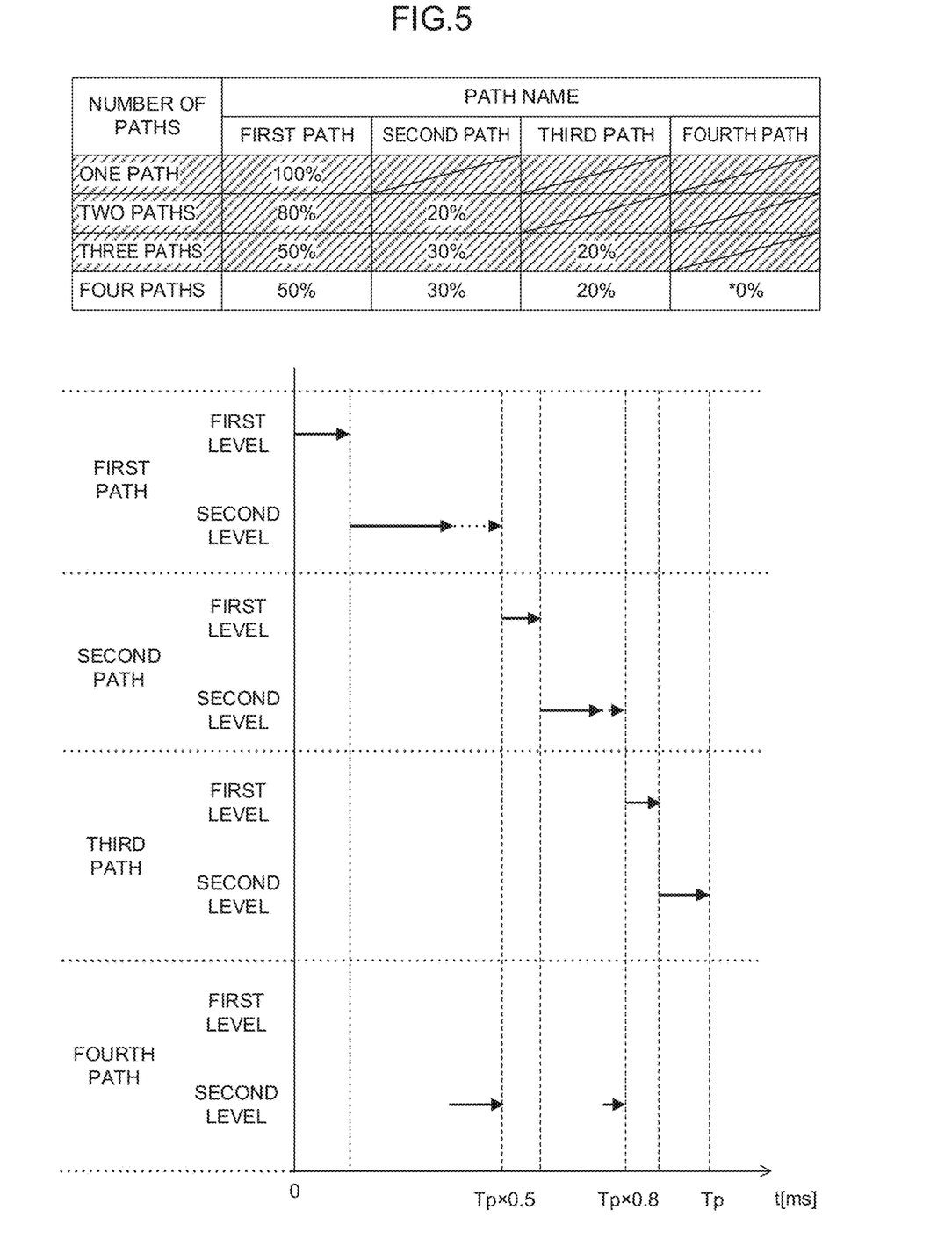
FIG. 5 shows an example in which a sequence program of a fourth path is operated in extra time.

FIG. 5 is an example in which the sequence program for the second level of the fourth path is executed in the extra time when the allocation time is allocated to each path as illustrated in FIG. 4.

When the execution of the sequence program for the first level and the sequence program for the second level ends and the extra time occurs within the allocation time of the first path, the executability determination unit 116 checks the path to which the extra time usage flag is given with reference to the allocation table. In the case of FIG. 5, the extra time usage flag is given to the fourth path, and hence the executability determination unit 116 instructs the sequence execution unit 112 to execute the sequence program of the fourth path in the extra time. Then, the sequence execution unit 112 that has accepted the instruction divides the sequence program for the second level of the fourth path stored in the program storage unit 210 and executes the sequence program within the extra time.

When there are sequence programs for a plurality of levels for the path to which the extra time usage flag is given, the allocation table may be able to designate the level of the sequence program to be executed. The sequence program for the first level is normally assumed to be executed in each operation cycle, and hence it is desired that the sequence program to be executed in the extra time be the sequence program for the second level.

In the abovementioned example, the extra time usage flag is given to a path that is usually not executed. However, the extra time usage flag may be given to a path that is desired to be executed prior to other sequence programs when the extra time occurs out of paths that are usually executed.

The programmable controller 1 according to this embodiment including the abovementioned configuration can efficiently use the extra time. The extra time can be used in the execution of sequence programs that are less important as compared to other sequence programs and in the execution of sequence programs desired to be executed prior to other sequence programs on the contrary.

As one modified example of the programmable controller 1 according to this embodiment, conditions for executing the sequence program in the extra time may be able to be set in the allocation table.

Figure 6:
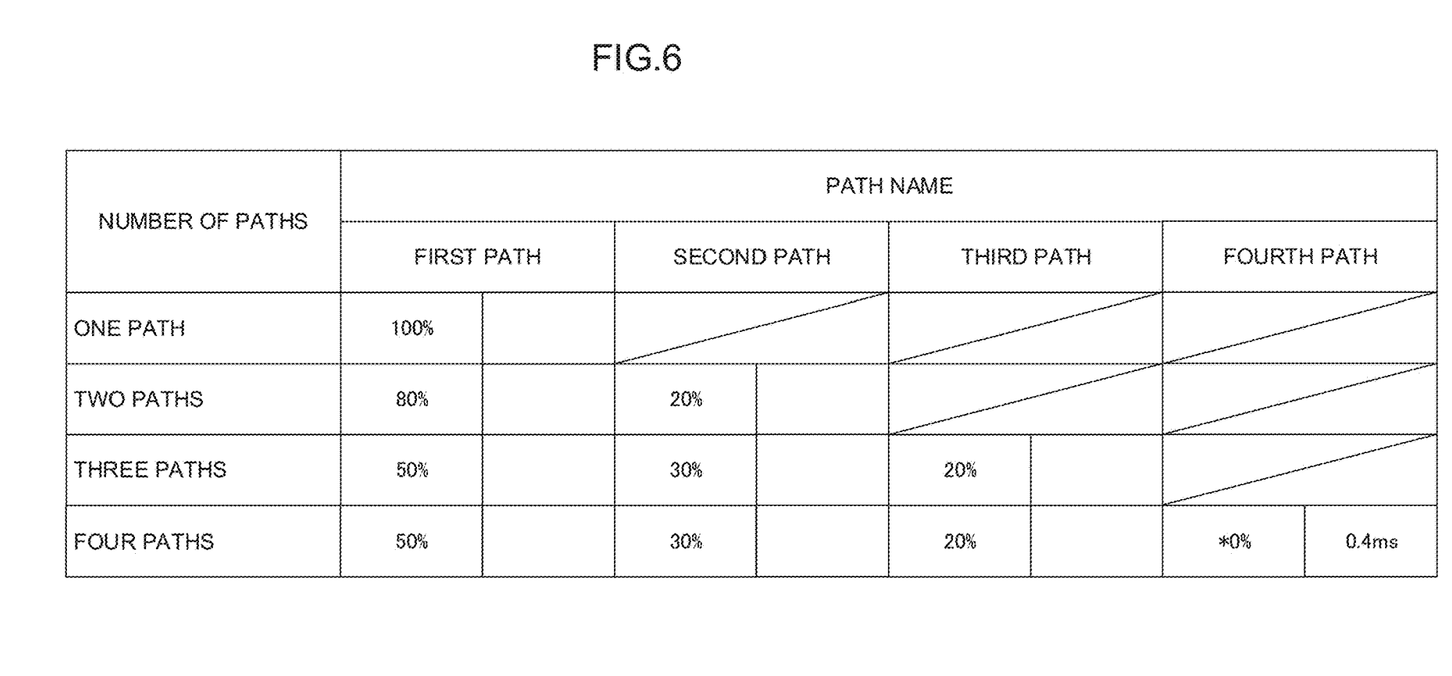
FIG. 6 shows an example in which execution conditions are set in the allocation table.

FIG. 6 shows an example of an allocation table in which the conditions for executing the sequence program in the extra time are set.

In the example in FIG. 6, when the sequence control of the four paths is performed, the allocation time is not allocated to the fourth path and the extra time usage flag is given to the fourth path such that the fourth path is executed when the extra time generated. The sequence program of the fourth path is set to be executed only when the extra time is 0.4 ms or more. At this time, when extra time occurs when the sequence program is being executed, the executability determination unit 116 instructs the sequence execution unit 112 to execute the sequence program of the fourth path in the extra time only when the generated extra time is 0.4 ms or more. By enabling execution conditions as above to be set, it can be determined whether a sequence program that cannot be executed unless there is extra time that is equal to or more than a predetermined threshold value, for example, is to be executed in accordance with the length of the extra time. As the execution conditions, the state of a predetermined signal, whether the sequence program is executed after being divided, and the like may be able to be set as conditions besides conditions regarding the extra time described above. When the state of a predetermined signal is set as conditions, flexible operation in which a predetermined sequence program (for example, a sequence program that acquires an operation log) is executed only when an operator inputs a signal instructing the execution of the predetermined sequence program from an operator's panel, for example, becomes possible. When the divided execution of the sequence program is set as conditions, flexible operation in which the extra time is used for the sequence program that has not ended within the executable time, for example, becomes possible.

Figure 7:
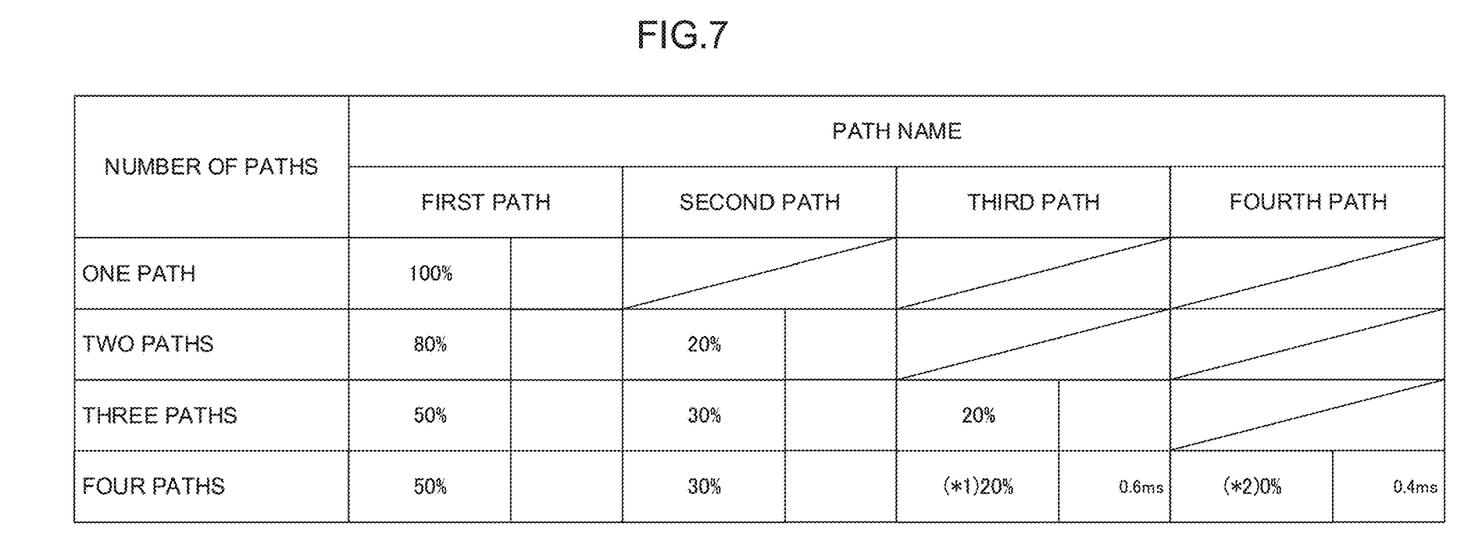
FIG. 7 shows an example in which the order of priority is set in the allocation table.

As another modified example of the programmable controller 1 according to this embodiment, when there are a plurality of sequence programs that are executable in the extra time, the order of priority of the execution of the sequence programs may be able to be set in the allocation table. FIG. 7 shows an example of an allocation table in which the order of priority is set for a plurality of sequence programs that are executable in the extra time.

In the example in FIG. 7, when the sequence control of four paths is performed, the allocation time is not allocated to the fourth path and the extra time usage flag is given to the fourth path such that execution is performed when the extra time occurs for the third path and the fourth path. In the extra time usage flags, the priority level is set such that the priority order of the third path is 1 and the priority order of the fourth path is 2. The execution conditions are set such that the third path is executed when the extra time is 0.6 ms or more and the fourth path is executed when the extra time is 0.4 ms or more. At this time, when the extra time occurs, the sequence program of the fourth path is executed when the extra time is less than 0.6 ms and the sequence program of the third path is executed when the extra time is equal to or more than 0.6 ms. As described above, by enabling the order of priority to be set, the execution of the sequence programs when the extra time occurs can be controlled in a more detailed manner.

Figure 8:
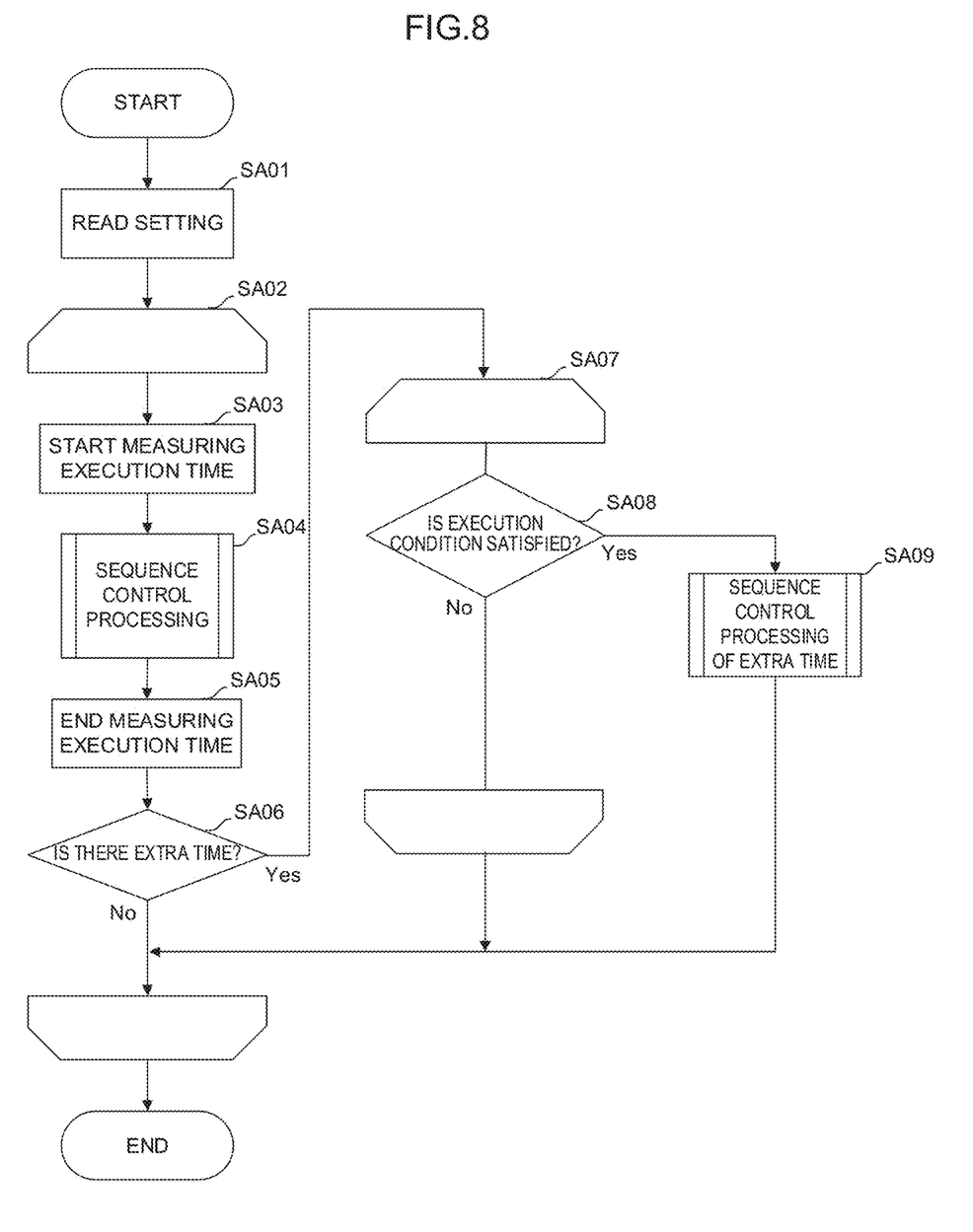
FIG. 8 is a flowchart illustrating a schematic operation of the programmable controller according to one embodiment.

FIG. 8 illustrates a schematic flowchart of the operation in one operation cycle of the programmable controller 1 of the abovementioned modified example.

The sequence control unit 110 included in the programmable controller 1 reads the settings of the allocation table stored in the allocation table storage unit 220 in each operation cycle (Step SA01) and allocates executable time to each path. Then, Step SA03 to Step SA09 are repeatedly executed for each path (Step SA02). In each path, the sequence execution unit 112 performs sequence control processing by executing a sequence program (Step SA04) while measuring the processing time by the timer 16 (Step SA03, Step SA05).

When the extra time measurement unit 114 confirms that extra time occurs in the allocation time (Step SA06), the executability determination unit 116 repeatedly executes Step SA08 and Step SA09 in accordance with the order of priority for the path to which the extra time usage flag is given in the allocation table (Step SA07). The executability determination unit 116 performs the determination regarding execution conditions such as the length of the extra time, the state of each signal, and whether the sequence program is being executed after being divided (Step SA08). When the execution conditions are satisfied, the executability determination unit 116 instructs the sequence execution unit 112 to execute the sequence program of the path within the extra time. Then, the sequence execution unit 112 executes the instructed sequence program in the extra time (Step SA09).

One embodiment of the present invention has been described above, but the present invention is not limited to the example of the embodiment described above and can be carried out in various modes by making modifications, as appropriate.

The invention claimed is:

1. A programmable controller for allocating, to a plurality of paths each having a sequence program, allocation times obtained by dividing executable time in one operation cycle at a predetermined ratio, and executing the sequence programs of the plurality of paths in the respective allocation times, the programmable controller comprising:
   a sequence execution unit configured to execute the sequence programs within the respective allocation times;
   an extra time measurement unit configured to measure extra time that is a remainder of each of the allocation times when execution of each of the sequence programs ends;
   an executability determination unit configured to
      determine whether or not a predetermined sequence program is to be executed in the extra time measured by the extra time measurement unit, and
      instruct the sequence execution unit to execute the predetermined sequence program in the extra time in accordance with a result of the determination; and
   an allocation table storage unit storing an allocation table in which the predetermined ratio at which the executable time is allocated to the execution of the sequence program of each of the plurality of paths is set, wherein
   (i) at least one path, among the plurality of paths, which is to be executed in the extra time when the extra time occurs, and (ii) an execution condition for execution of the at least one path in the extra time are set in the allocation table,
   each of the sequence programs of the plurality of paths has a plurality of program levels,
   each of the plurality of program levels includes a first level and a second level, and
   the executability determination unit is configured to, in response to the sequence execution unit executing the sequence programs for the first level, determine whether the sequence programs for the second level are to be executed in the extra time.

2. The programmable controller according to claim 1, wherein
an extra time usage flag that designates the at least one path to be executed in the extra time is settable in the allocation table, and
the executability determination unit is configured to, in response to the extra time usage flag set on the at least one path, determine that the predetermined sequence program of the at least one path is to be executed in the extra time.

3. The programmable controller according to claim 2, wherein
the executability determination unit is configured to determine that the predetermined sequence program of the at least one path is to be executed in the extra time in response to the execution condition being satisfied.

4. The programmable controller according to claim 3, wherein
the at least one path to be executed in the extra time comprises two or more paths among the plurality of paths,
an order of priority among the two or more paths is further settable in the allocation table, and
the executability determination unit is configured to determine which of the two or more paths is to be executed in the extra time in consideration of the order of priority.

5. The programmable controller according to claim 1, wherein the execution condition includes at least one of
the extra time being longer that a predetermined threshold value,
a predetermined state of a signal, or
a predetermined order of priority of multiple paths, among the plurality of paths, when the multiple paths are set to be executed in the extra time.

6. The programmable controller according to claim 1, wherein the execution condition includes the extra time being longer that a predetermined threshold value.

7. The programmable controller according to claim 1, wherein the execution condition includes a predetermined state of a signal.

8. The programmable controller according to claim 1, wherein the execution condition includes a predetermined order of priority of multiple paths, among the plurality of paths, when the multiple paths are set to be executed in the extra time.

9. A programmable controller for allocating, to a plurality of paths each having a sequence program, allocation times obtained by dividing executable time in one operation cycle at a predetermined ratio, and executing the sequence programs of the plurality of paths in the respective allocation times, the programmable controller comprising:
a processor configured to
execute the sequence programs within the respective allocation times,
determine extra time that is a remainder of each of the allocation times when execution of each of the sequence programs ends,
make a determination whether or not a predetermined sequence program is to be executed in the extra time, and
execute the predetermined sequence program in the extra time in accordance with a result of the determination; and
a memory storing an allocation table in which the predetermined ratio at which the executable time is allocated to the execution of the sequence program of each of the plurality of paths is set, wherein
(i) at least one path, among the plurality of paths, which is to be executed in the extra time when the extra time occurs, and (ii) an execution condition for execution of the at least one path in the extra time are set in the allocation table,
each of the sequence programs of the plurality of paths has a plurality of program levels,
each of the plurality of program levels includes a first level and a second level, and
the processor is configured to, in response to executing the sequence programs for the first level, determine whether the sequence programs for the second level are to be executed in the extra time.

* * * * *